Patented May 15, 1928.

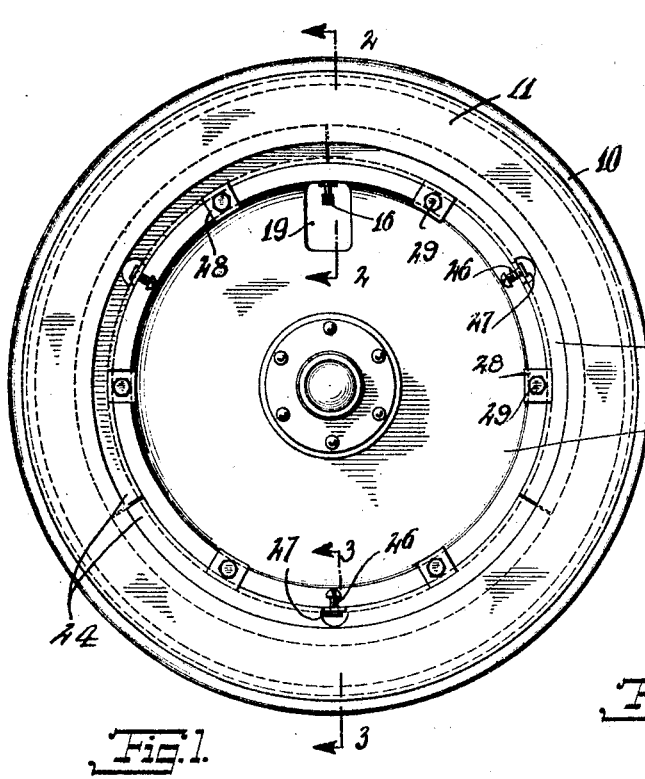

1,669,583

UNITED STATES PATENT OFFICE.

LODWICK J. WENTZEL, OF BROOKLYN, NEW YORK.

PUNCTUREPROOF TIRE FOR VEHICLES.

Application filed November 27, 1926. Serial No. 151,032.

This invention relates to a new and useful device in the nature of a tire for motor vehicles for the purpose of providing a puncture proof tire normally having resilient qualities.

The object of the invention is to provide a puncture proof tire for motor vehicles of novel construction and arrangement of parts, hereinafter more fully described, claimed, and illustrated in the accompanying drawing, in which:

Fig. 1 shows a side elevational view of a motor vehicle wheel equipped with my improved puncture proof tire.

Fig. 2 shows a fragmentary enlarged sectional view taken on the line 2—2 of Fig. 1.

Fig. 3 shows a similar view taken on the line 3—3 of Fig. 1.

Fig. 4 shows a fragmentary side elevational view of a motor vehicle wheel equipped with a modification of my improved puncture proof tire.

Fig. 5 shows a fragmentary enlarged sectional view taken on the line 5—5 of Fig. 4.

As here embodied my improved puncture proof tire for motor vehicles comprises an outer tire 10, preferably of solid molded rubber, of ring shaped construction. The side members 11 and 12, are circularly shaped, so as to form a ring, and are provided with inwardly projecting elements, 13 and 14, respectively, adapted to engage in circumferential grooves formed in the outer tire 10. The inner tube 15, such as generally used in combination with motor vehicle tires of the ordinary construction, is provided with the usual valve stem 16, having the usual valve and cap generally provided as a means of inflating the said inner tube. The valve stem 16 projects through an aperture formed in the felloe band 17 of the motor vehicle wheel 18, which is provided with an opening 19 affording accessibility to the said valve stem. The above mentioned motor vehicle wheel is of the disc type such as is commonly used for present day motor vehicles. It should be understood that I do not necessarily limit the use of my improved invention to motor vehicle wheels of this particular type, but to all classes and types of motor vehicle wheels such as generally used.

The latter described construction is such as will permit the threaded members 26, when in an extended position to support the outer rim 10, in event the inner tube 15 is punctured or otherwise deflated permitting further use of the tire until the tube 15 can be repaired. When the threaded members 26 are used, the only resiliency of the tire exists in the outer tire 10.

The outer rim 20 of ring shaped construction, is adapted to support the outer tire 10, and is provided with inwardly projected elements 21 and 22, adapted to engage inside the side members 11 and 12. The inner rim 23, of ring shaped construction, is adapted to engage over the said felloe band 17 of the motor vehicle wheel 18, and is provided with outwardly extended elements 24, and 25, adapted to engage inside the side members 11 and 12. The inner rim 23, is made up in segments, as a means of applying same to the said felloe band. The threaded members 26, are threadedly attached to the inner rim 23, and are provided with enlarged heads 27, adapted to engage the side members 11 and 12, when the threaded members 26 are in an extended position.

The above described construction is such as will provide a space for the said inner tube 15, intermediate the outer rim 20, and the inner rim 23. The above described elements are removably attached to the motor vehicle wheel 18 by a plurality of clip members 28, removably attached to the said felloe band by the threaded members 29, bolts, screws, or the like.

Referring in particular to Figs. 4 and 5, of the accompanying drawing, in which I have illustrated a modification of my improved puncture proof tire, the outer tire 10, is provided with circumferential grooves adapted to receive the extended elements 30 and 31, of the retaining member 32. The retaining member 32, is of ring shaped construction, preferably of I beam cross section, and is provided with inwardly side extended elements 33 and 34, adapted to engage outside the outwardly extended elements 35 and 36, respectively of the rim 37, of ring shaped construction. The above mentioned elements are removably attached to the felloe band 17 of the motor vehicle wheel 18, by the band member 38, adapted to engage the side of the rim 37, and removably attached to the said felloe band by a plurality of threaded members 39, bolts, screws, or the like. The above mentioned inner tube 15, is positioned in the space provided between or intermediate the rim 37 and the retaining member 32.

It is obvious that I have provided a puncture proof tire having resilient qualities.

Having thus described my invention, what I claim as new and desire to protect by Letters Patent of the United States is as follows:

In a device of the class described, the combination with a vehicle wheel, of an inner rim mounted thereon comprising spaced outwardly disposed side extensions, an outer rim comprising spaced inwardly directed side extensions slidably mounted on the side extensions of said inner rim in overlapped relation, an inner tube disposed between said rims and the side extensions thereof adapted to be inflated for resiliently holding said rims in spaced relation, and means comprising screws threadedly attached to said inner rim adapted to be extended in advance thereof for engaging the edge of the side extensions of said outer rim for rigidly holding the latter in spaced relation to said inner rim when said tube is deflated.

In testimony whereof I have affixed my signature.

LODWICK J. WENTZEL.